Patented Jan. 9, 1945

2,366,825

UNITED STATES PATENT OFFICE 2,366,825

POLISHING OF GLASS SURFACES

Frederick W. Adams, Pittsburgh, Pa., assignor to Pittsburgh Plate Glass Company, Allegheny County, Pa., a corporation of Pennsylvania No Drawing. Application February 27, 1943, Serial No. 477,448

10 Claims. (Cl. 51—283)

The present invention relates to the polishing of glass surfaces by means of suspensions of rouge.

One object of the invention is to reduce the labor involved in the polishing operations.

A second object is to provide glass surfaces having higher resistance to formation of stain than glasses polished in conventional manner.

These and other objects will be apparent from consideration of the following specification and the appended claims.

Sheet or plate glass as obtained by rolling or drawing operations is often subjected to grinding and polishing, first with sand in order to bring the surface to a uniform plane and finally with rouge, in order to remove surface scratches. In the polishing operation the rouge, of necessity, is of very fine grain and its polishing action upon the glass surface is comparatively slow, so that a great deal of power and time is expended, even after the major portion of the glass required to obtain smooth plates has been removed.

Furthermore, it is to be recognized that glass includes in its composition oxides of alkali and alkali earth metals which are comparatively easily attacked by moisture. Under certain conditions of service these oxides may produce objectionable scum or stain upon the glass.

In accordance with the provisions of the present invention it is proposed to speed up the rate of polishing of glass and simultaneously to increase the resistance to stain of the resultant glass surfaces by employing in the polishing operation a suspension of rouge in an etching acid, such as hydrochloric acid or hydrofluoric acid. It is preferable that the suspension also contain an alkali metal salt, such as sodium chloride. The acid it is found assists in removing portions of the surface film of glass to obtain the polish and this is especially true of small projecting points which would require the expenditure of considerable time to remove if subjected merely to the action of the polishing rouge. The acid also tends to dissolve out alkali and alkali earth metal compounds. The latter compounds inherently dissolve much slower than do the alkali metal compounds, but due to the presence of the alkali metal salts the solution of the alkali metal oxides in the glass is retarded and a better opportunity is afforded for the action of the etching acid upon the alkali metal compounds. As a result, the surface of the glass is substantially enriched in silica and correspondingly impoverished in alkaline earth metals. Surfaces of this character are more highly resistant to stain than are surfaces containing alkali and alkaline earth compounds in a higher proportion.

In the practice of the invention a glass, such as a conventional, a lead glass, a barium crown glass or a lime-soda glass containing considerable amounts of lime and alkali metals, e. g., sodium or potassium, is first ground with a suspension of sand and then is subjected to polishing with rouge of conventional type. However, the rouge is suspended in dilute acid to which an alkali salt is added. The acid may be in a proportion to obtain a normality of 1 or 2. Similarly the alkali metals salt, such as sodium chloride, may be in proportion to obtain a normality of about 1. Other salts, notably iron salts, such as ferrous or ferric sulfate, may be added to the rouge in order to improve the suspension of the rouge particles, reduce evaporation and increase the adhesion of the rouge to the glass surface. Polishing is effected under conventional revolving disks or runner blocks which preferably are faced with felt to which the rouge is added. The operation is continued until a satisfactory polish or smoothness of surface is obtained. By the combined action of the acid and the rubbing of the rouge the polishing operation is expedited.

The application of the invention to the polishing of flat glass sheets or plates has been specifically mentioned. However, it will be apparent that the invention may also be applied to the polishing of rounded surfaces, such as those of glass lenses or in fact any other glass surface to which a rouge suspension can be applied.

The glass after it has been polished to a satisfactory degree is washed and dried. It may also be baked, for example, at a temperature of about 200° C. for a period of about 10 or 15 minutes. The baking operation tends to increase the resistance of the surface to scratching and staining.

The forms of the invention herein described are considered merely as exemplary and it will be apparent to those skilled in the art that numerous modifications may be made therein without departure from the spirit of the invention or the scope of the appended claims.

What I claim is:

1. A method of polishing glass surfaces, which comprises subjecting them to a rubbing action with a suspension of rouge in a dilute halogen acid solution containing an alkali metal salt.

2. A method of polishing surfaces of lime-soda glass, which comprises subjecting them to a rubbing action with a suspension of rouge in a dilute halogen acid containing an alkali metal salt of a halogen.

3. A method of polishing lime-soda glass, which comprises subjecting the surface of the glass to a rubbing action with a suspension of rouge in dilute hydrochloric acid containing sodium chloride.

4. A method of polishing a surface of a body of lime-soda glass, which comprises subjecting it to frictional action with a suspension of rouge in a dilute halogen acid from the class consisting of hydrochloric acid and hydrofluoric acid.

5. A method of polishing glass, which comprises subjecting it to a rubbing action with rouge in suspension in dilute hydrochloric acid containing a soluble iron salt.

6. A method as defined in claim 5 in which the acid solution further contains an alkali metal salt.

7. A method as defined in claim 5 in which the solution further contains a halogen salt of an alkali metal.

8. A method of polishing glass, which comprises subjecting it to a rubbing action with rouge in dilute hydrofluoric acid containing a soluble iron salt.

9. A method as defined in claim 8 in which the hydrofluoric acid solution further contains an alkali metal salt.

10. A method as defined in claim 8 in which the hydrofluoric acid solution further contains a halogen salt of an alkali metal.

FREDERICK W. ADAMS.